Oct. 27, 1925.  1,559,430
J. B. HOCKERSMITH
LIVE STOCK FLYTRAP
Filed Feb. 2, 1924  2 Sheets-Sheet 2
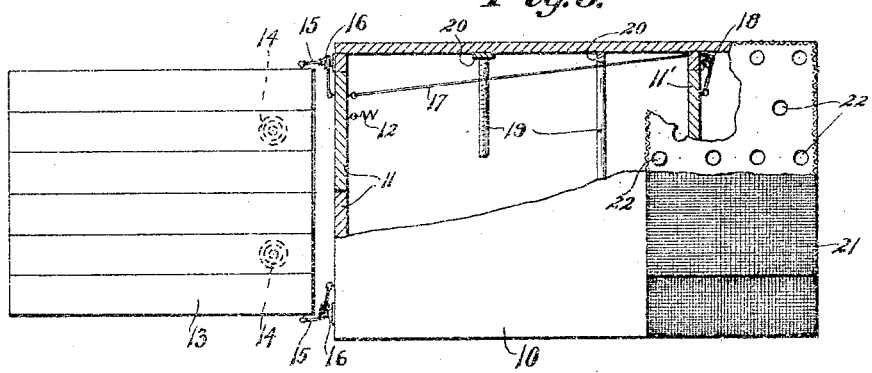
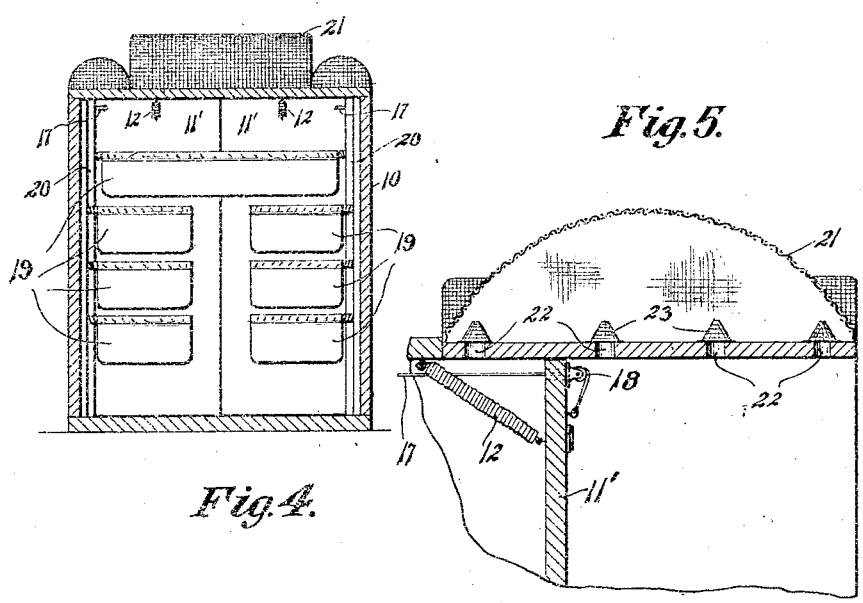
J.B. Hockersmith,
INVENTOR.
BY Victor J. Evans.
ATTORNEY.
WITNESSES.

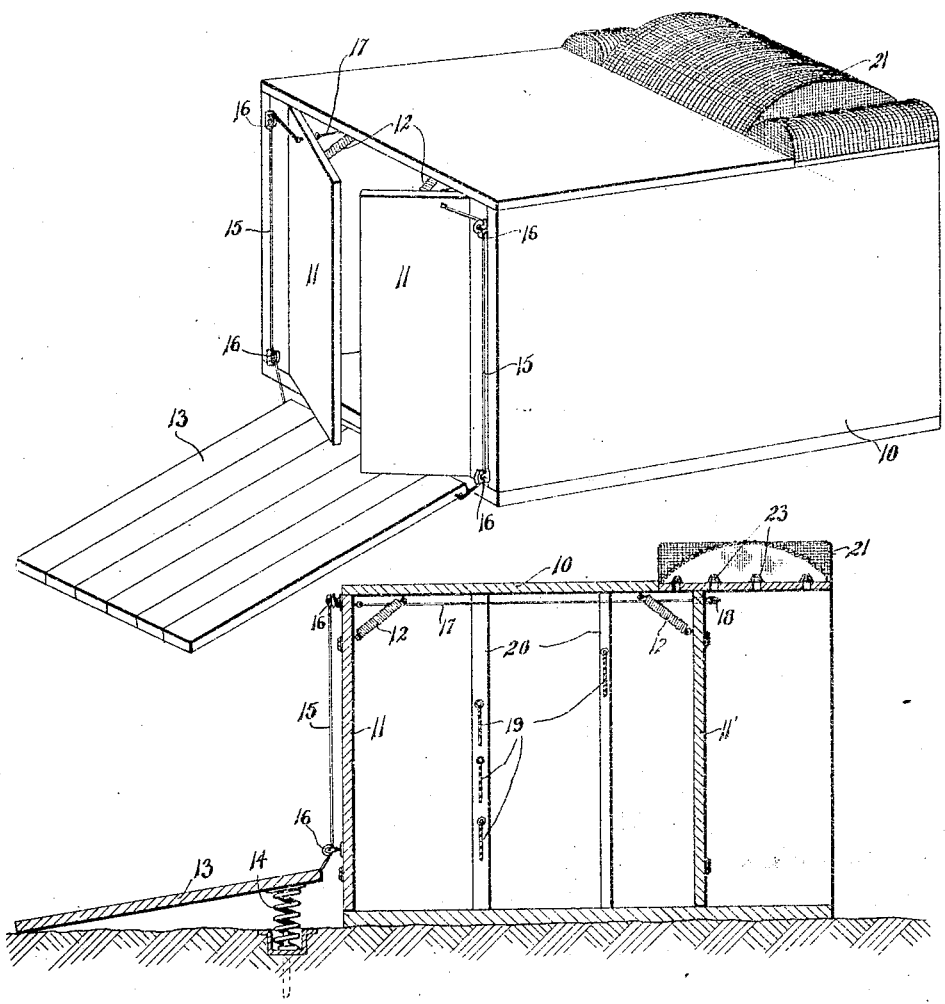

Patented Oct. 27, 1925.

1,559,430

UNITED STATES PATENT OFFICE.

JAMES B. HOCKERSMITH, OF TAYLORVILLE, ILLINOIS.

LIVESTOCK FLYTRAP.

Application filed February 2, 1924. Serial No. 690,251.

*To all whom it may concern:*

Be it known that I, JAMES B. HOCKERSMITH, a citizen of the United States, residing at Taylorville, in the county of Christian and State of Illinois, have invented new and useful Improvements in Livestock Flytraps, of which the following is a specification.

This invention comprehends the provision of a device designed to brush flies or other insects off the body of an animal, and to subsequently trap said insects.

In carrying out the invention, I make use of a cabinet through which the animal is adapted to pass, the cabinet having arranged therein a suitable means for brushing or removing the flies or insects from the body of the animal, while also associated with the cabinet is a trap into which the insects are induced to enter after being removed from the body of the animal.

Another object of the invention resides in providing a cabinet of the above mentioned character which has its opposed ends normally closed by spaced pairs of swinging doors which doors are connected with a yieldable platform, so that the doors are automatically opened in unison when the platform is depressed under the weight of the animal.

Other objects and advantages of the invention will appear when the following detailed description is read in connection with the accompanying drawings, the invention residing in the combination, construction and arrangement of parts as claimed.

In the drawings forming part of this application, like numerals of reference indicate similar parts in the several views, and wherein:

Figure 1 is a perspective view.

Figure 2 is a longitudinal sectional view through the trap.

Figure 3 is a top plan view partly in section.

Figure 4 is a vertical transverse sectional view through the trap.

Figure 5 is an enlarged fragmentary sectional view of the rear end of the trap.

Referring to the drawings in detail, 10 represents a cabinet or tunnel like member which may be constructed from any suitable material and also vary in configuration without departing from the spirit of the invention, although the cabinet must be of size to permit live stock to pass therethrough. The cabinet is opened at its opposite ends, but these ends are normally closed by doors as shown. For each end I provide a pair of swinging doors 11, and the doors at both ends of the cabinet are adapted to swing outwardly to an open position. The doors are normally maintained in a closed position by means of springs 12. However, as above stated, these doors are automatically opened when the platform 13 is depressed under the weight of the animal about to enter the cabinet. The platform is normally maintained elevated as shown by means of heavy springs 14. Connected to each side of the platform 13 is a cable 15, and this cable is trained over pulleys 16 mounted on the adjacent end of the cabinet, and terminally secured to the upper edge of the adjacent door as clearly shown. Also connected with this door is a cable 17 which passes through the cabinet and has its other end connected to the corresponding door 11' at the rear of the cabinet, although this cable 17 is trained about the idle pulley 18. By reason of this construction, it is clear that when the platform 13 is depressed under the weight of the animal about to enter the cabinet, a pull downwardly is exerted upon each cable 15 thereby opening the doors 11 at the front of the cabinet. As these doors swing outwardly to an open position, a pull is exerted in a forward direction upon the cables 17, which are connected with the doors 11' at the rear of the cabinet in a manner to swing these doors to an open position simultaneously with the swinging doors at the front of the cabinet. After the animal passes out of the cabinet, the doors are returned to normal position by means of the springs 12, while the platform is returned to an elevated position by means of the spring 14. Arranged within the cabinet is a group of flexible members, each being similar to a small curtain, and supported by a resilient frame. If desired the trap can be arranged partly within the door opening of a barn, with a portion of the trap proper indicated at 21 partly exposed to the light. Consequently when an animal passes through the cabinet 10 into the barn, the insects are brushed from the body of the animal by means of the members indicated at 19. After the animal leaves the cabinet and enters the barn, both the doors 11 and 11' at the front and rear of the cabinet close, the flies trapped within the cabinet will enter the trap 21 through the exit opening 22 formed in the bottom of the trap, and which opening establishes communication between the cabinet and said trap. Other insects which are not trapped within the cabinet but which have been brushed off the body of the animal will seek to escape through the trap 21, inasmuch as such insects are attracted by the light, and this fact coupled with the fact that the interior of the barn is darkened, said insects will fly in the direction of the light and alternately enter the trap 21 through the other openings 22 in the bottom of the trap which are arranged beyond the doors 11′. These members are indicated at 19 and supported by frames at 20. Any number of these members may be used, the members being arranged to contact the body of the animal for the purpose of removing flies and insects therefrom as the animal passes through the cabinet, and it is of course to be understood that the members can be arranged in the most advantageous manner for this purpose.

The insects thus removed from the body of the animal are received by a suitable trap, and this trap is arranged in the manner clearly illustrated in the drawings. In this connection it will be noted that the side walls of the cabinet project an appreciable distance rearwardly of the top of the cabinet and also with relation to the dors 11′, and that the trap just referred to is arranged to occupy the space between these side walls at a point immediately adjacent the top of the cabinet and at the rear thereof. The body of this trap is preferably constructed of wire screening and is indicated at 21, while the bottom of the trap is preferably constructed of wood having a plurality of openings 22 through which the insects are allowed to enter the trap, the openings are of a reasonable size for this purpose, and rising from each opening is a substantially conical shape member 23 also constructed of wire, which member allows the insects to readily enter the trap but prevents their escape therefrom. By reason of the particular location of this trap with relation to the cabinet 10, the trap is exposed to light, while the interior of the cabinet is darkened and consequently, the insects are induced to enter the trap in finding their way to the light. The trap can be mounted on the cabinet in any suitable manner to permit of its removal therefrom when it is desired to enter the trap as will be readily understood.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A device of the character described comprising a cabinet open at both ends and through which an animal is adapted to pass, a normally elevated platform adapted to be depressed by the weight of the animal, swinging doors normally closing the ends of the cabinet, means for automatically swinging the doors to an open position when the platform is depressed, means arranged within the cabinet for removing insects from the body of the animal, and a trap supported by the cabinet and adapted to receive said insects.

2. A device of the character described comprising a cabinet open at both ends and through which an animal is adapted to pass, a yieldably supported normally elevated platform, swinging doors for each end of the cabinet, yieldable means for normally holding the doors in a closed position, means connected with the said doors and with said platform, whereby the doors at both ends of the cabinet are simultaneously opened when the platform is depressed, means arranged within the cabinet for removing flies from the body of the animal, and an insect trap supported by the cabinet, and beyond the adjacent doors thereof and exposed to the light for the purpose specified.

JAMES B. HOCKERSMITH.